(12) United States Patent
Raza et al.

(10) Patent No.: US 8,325,783 B2
(45) Date of Patent: Dec. 4, 2012

(54) SPREADING CODE OPTIMIZATION BASED ON QUALITY FACTORS

(75) Inventors: Syed Hassan Raza, Overland Park, KS (US); Nasir Mahmood Mirza, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 833 days.

(21) Appl. No.: 12/236,020

(22) Filed: Sep. 23, 2008

(65) Prior Publication Data

US 2010/0074306 A1 Mar. 25, 2010

(51) Int. Cl.
*H04L 7/00* (2006.01)
*H04L 25/00* (2006.01)
*H04L 25/40* (2006.01)

(52) U.S. Cl. ........................... 375/141; 375/371

(58) Field of Classification Search ............. 375/E1.001, 375/E1.002, 260, 371, E1.008, 148, E1.029, 375/146; 370/338, 346, 342, 503; 455/450
See application file for complete search history.

(56) References Cited

U.S. PATENT DOCUMENTS

| | | | | |
|---|---|---|---|---|
| 5,726,984 | A * | 3/1998 | Kubler et al. | 370/349 |
| 5,771,229 | A * | 6/1998 | Gavrilovich | 370/342 |
| 5,926,501 | A * | 7/1999 | Souissi et al. | 375/131 |
| 6,744,808 | B1 | 6/2004 | Walley et al. | |
| 6,876,690 | B1 | 4/2005 | Imbeni et al. | |
| 7,280,581 | B2 * | 10/2007 | Khan | 375/141 |
| 7,313,124 | B2 | 12/2007 | Lim et al. | |
| 2002/0075831 | A1* | 6/2002 | Lozano | 370/335 |
| 2004/0028121 | A1* | 2/2004 | Fitton | 375/144 |
| 2005/0141473 | A1 | 6/2005 | Lim et al. | |
| 2008/0240307 | A1* | 10/2008 | Wang et al. | 375/343 |

FOREIGN PATENT DOCUMENTS

EP 0632611 1/1995

OTHER PUBLICATIONS

Thamer Al-Meshhadany, et al., "A New Code Allocation Scheme for UMTS System," IEEE 54th Vehicular Technology Conference, Fall 2001, pp. 930-933, vol. 2, IEEE, Atlantic City, New Jersey.

* cited by examiner

*Primary Examiner* — David C. Payne
*Assistant Examiner* — Wednel Cadeau (57) ABSTRACT

What is disclosed is a method of operating a communication system. The method includes receiving a request to initiate a communication session with a wireless communication device, wherein the request indicates an application type. The method also includes determining a spreading code based on the application type, and transferring the spreading code to the wireless communication device. The method also includes receiving communications for the communication session encoded with the spreading code and decoding the encoded communications based on the spreading code.

20 Claims, 6 Drawing Sheets

SPREADING CODE OPTIMIZATION BASED ON QUALITY FACTORS

TECHNICAL FIELD

Aspects of the disclosure are related to the field of communications, and in particular, to communication encoding in wireless communication networks.

TECHNICAL BACKGROUND

Wireless communication networks typically include wireless communication devices which, via a wireless communication system, communicate with further communication networks and equipment. The wireless communication system typically includes antennas, base stations, wireless access nodes, and other associated equipment to route communications over wireless links from the wireless communication devices to further communication networks, equipment, and destinations. Each wireless communication device typically exchanges communications with one wireless access node at a time, while many wireless communication devices can be in communication with the same access node simultaneously.

The wireless communication system typically employs various communication protocols to facilitate communication over wireless links with wireless communication devices. These communication protocols many times include features to ensure reliable communications as well as share the wireless links among many wireless communication devices simultaneously. In order to support the many wireless communication devices communicating with the wireless communication system simultaneously, some of the various communication protocols employ spread spectrum features.

These spread spectrum features are typically used to spread the energy of communications over a large portion of the available bandwidth of the wireless link in an effort to minimize interference, jamming, detection, and crosstalk among the possibly many wireless communication devices. These spread spectrum protocols also employ a spreading code to determine how to spread the energy across the available bandwidth. This spreading code typically comprises a random or pseudo-random sequence to spread the RF energy in a similarly random or pseudo-random fashion.

OVERVIEW

What is disclosed is a method of operating a communication system. The method includes receiving a request to initiate a communication session with a wireless communication device, wherein the request indicates an application type. The method also includes determining a spreading code based on the application type, and transferring the spreading code to the wireless communication device. The method also includes receiving communications for the communication session encoded with at least the spreading code and decoding the encoded communications.

What is also disclosed is a communication system. The communication system includes an access node configured to receive a request to initiate a communication session with a wireless communication device, wherein the request indicates an application type. The communication system also includes a control node configured to determine a spreading code based on the application type. The access node is configured to transfer the spreading code to the wireless communication device and receive communications for the communication session encoded with at least the spreading code. The control node is configured to decode the encoded communications.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
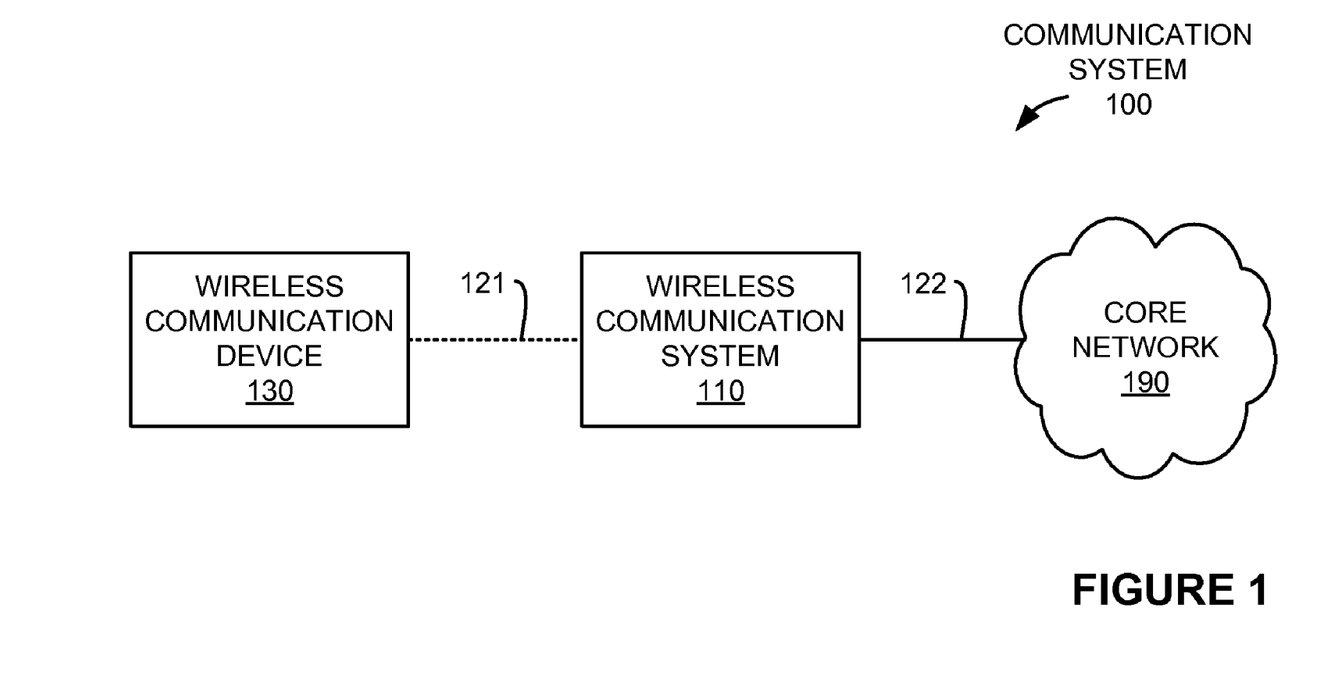
FIG. 1 is a system diagram illustrating a communication system.

FIG. 1 is a system diagram illustrating communication system 100. Communication system 100 includes wireless communication device 130, wireless communication system 110, and core network 190. Wireless communication device 130 and wireless communication system 110 communicate over wireless link 121. Wireless communication system 110 and core network 190 communicate over link 122.

Wireless communication device 130 comprises a telephone, transceiver, computer, digital assistant, smart phone, Internet appliance, or some other wireless communication apparatus—including combinations thereof.

Wireless communication system 110 includes wireless communications equipment capable of communicating with wireless communication device 130. Examples of wireless communication system 110 can include base stations, base transceiver stations, boomer stations, antennas, radio node controllers (RNC), mobile switching controllers, call processing equipment, wireless access points, telephone switches, Internet routers, network gateways, as well as other type of communication equipment—including combinations thereof.

Core network 190 could include an Internet network, wireless network, telephony network, optical network, enterprise network, local area network, or some other type of communication network or communication equipment—including combinations thereof.

Wireless link 121 uses various communication media, such as air, space, or some other wireless transport media—including combinations thereof. Wireless link 121 uses various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

Wireless link 121 may comprise many different signals sharing the same link. Wireless link 121 could include multiple signals operating in a single "airpath"—as represented by the dashed line in FIG. 1—comprising multiple communication sessions, frequencies, timeslots, transportation ports, logical transportation links, network sockets, IP sockets, packets, or communication directions. For example, communications for different applications types between wireless communication device 130 and wireless communication system 110 could share the same wireless link 121, but be transferred over different communication sessions, frequencies, timeslots, packets, ports, sockets, logical transport links, or in different directions—including combinations thereof.

Link 122 uses various communication media, such as air, space, metal, optical fiber, or some other signal propagation path—including combinations thereof. Link 122 could be wired or wireless and use various communication protocols such as Internet, Internet protocol (IP), local-area network (LAN), optical networking, hybrid fiber coax (HFC), telephony, T1, or some other communication format—including combinations or variations thereof. Link 122 could be a direct link or might include various equipment, intermediate components, systems, and networks. Link 122 could include multiple signals operating in a single pathway in a similar manner as wireless link 121.

Figure 2:
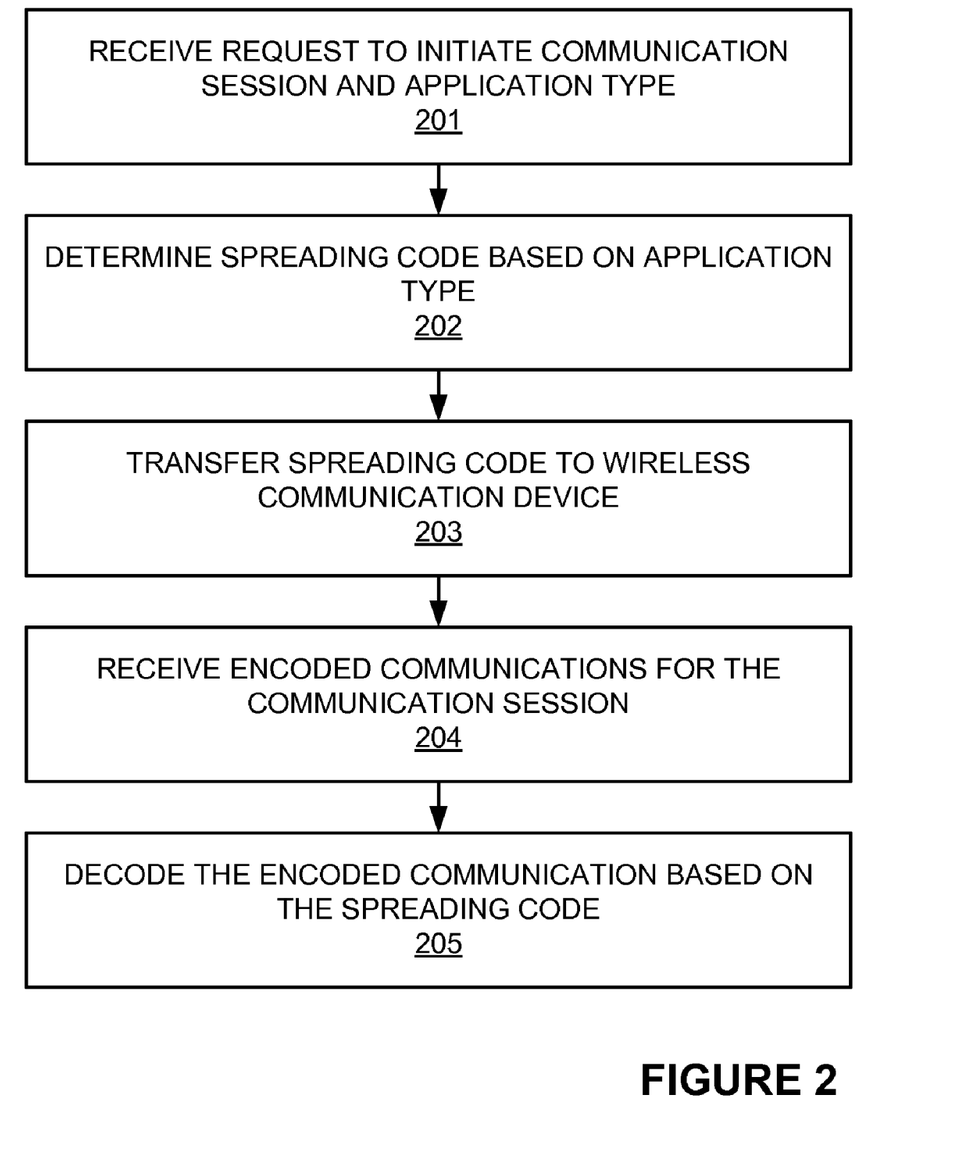
FIG. 2 is a flow diagram illustrating a method of operation of a video system.

FIG. 2 is a flow diagram that illustrates a method of operation of communication system 100, as found in FIG. 1. The phases shown in FIG. 2 are indicated herein parenthetically. In FIG. 2, a request to initiate a communication session with wireless communication device 130 is received (201), where the request indicates an application type.

An application type comprises a user service or user communications as implemented in communication packets transferred between wireless communication device 130 and wireless communication system 110. The user services, for example, could include Internet communications, voice calls, telephony, video, audio, email, text, chat data, web pages, peer-to-peer (P2P) communications, Voice over IP (VoIP), as well as other data and application types—including combinations thereof. The application could also be distinguished among different service providers, even though such service providers are providing similar types of user services. For example, although Voice over IP (VoIP) is a type of user service, various service providers, could also be distinguished from each other, much like the individual user services.

In some examples, the application types are further grouped into tiers. These tiers group together application types of similar variety, content, protocols, or according to other factors to reduce a possibly large number of application types to a more manageable set of categories.

A spreading code is then determined (202) based upon the application type. Once the spreading code has been determined, the spreading code is transferred (203) to wireless communication device 130.

The spreading code is used, in typical examples, to encode communications of a communication session over wireless link 121. The encoding scheme could indicate a spread spectrum frequency coding scheme, or be information used for determining a sequence of frequency hops, among other schemes. For example, in a wireless link supporting multiple CDMA-based communication sessions, the information from each session of the wireless link could be spread over the entire wireless link bandwidth. The spreading code is typically determined in such a way that only the intended recipient of communications encoded with the spreading code can decode the communications. In some examples, the same spreading code is used for all communications from wireless communication device 130 over wireless link 121, while in other examples, the spreading code is used only for communications of a particular communication session.

In many examples, the quality of the communications can be influenced by the quality of the spreading code. Several spreading code quality factors or metrics can impact a spreading code and the spreading code effectiveness over a wireless link. These quality factors include auto-correlation, cross-correlation, crest factor, and diversity, among other factors. The factors could also be periodic or aperiodic. Correlation is typically defined as a relationship between spreading codes, and how closely communications encoded with the spreading code relate to one another—cross-correlation relates to how different communication sessions correlate to one another over a time frame, and auto-correlation relates to how a communication session correlates to itself over a time frame. Crest factor relates to the ratio of the peak power of a communication session to an average power of the communication session. Diversity relates to the amount of energy spreading over a particular bandwidth that a spreading code achieves.

Advantageously, a spreading code in communication system 100 is determined (202) based upon the application type instead of by a random or pseudo-random basis. The various quality factors mentioned above could be tailored to a particular application type. For example, some application types require high bandwidth without requiring high reliability, such as video streaming. Other applications may require low bandwidth, but high reliability, such as voice communications. Additional factors could be considered in determining a spreading code, such as number of wireless communication devices in communication with wireless communication system 110, the desires of the operator of wireless communication system 110, the number of communication sessions active on wireless communication device 130, the locality of wireless communication device 130, activity level of wireless communication device 130, activity level of a sector in which wireless communication device 130 is located, among other factors. A further discussion on application-specific spreading codes is discussed below in the description relating to FIG. 6.

Encoded communications for the communication session are then received (204), where the encoded communications are encoded with the spreading code. The encoded communications are then decoded (205) based on the spreading code. Since the encoded communications are encoded with the spreading code, the communications are able to be decoded correctly and determined to be transferred from wireless communication device 130.

In further examples, wireless communication device 130, receives the spreading code and encodes the communications based on the spreading code. Wireless communication device 130 transfers the encoded communications over wireless link 121.

The communications received in wireless communication system 110 could also be further transferred to core network 190 over link 122, other systems in wireless communication system 110, or other equipment, including combinations thereof.

Figure 3:
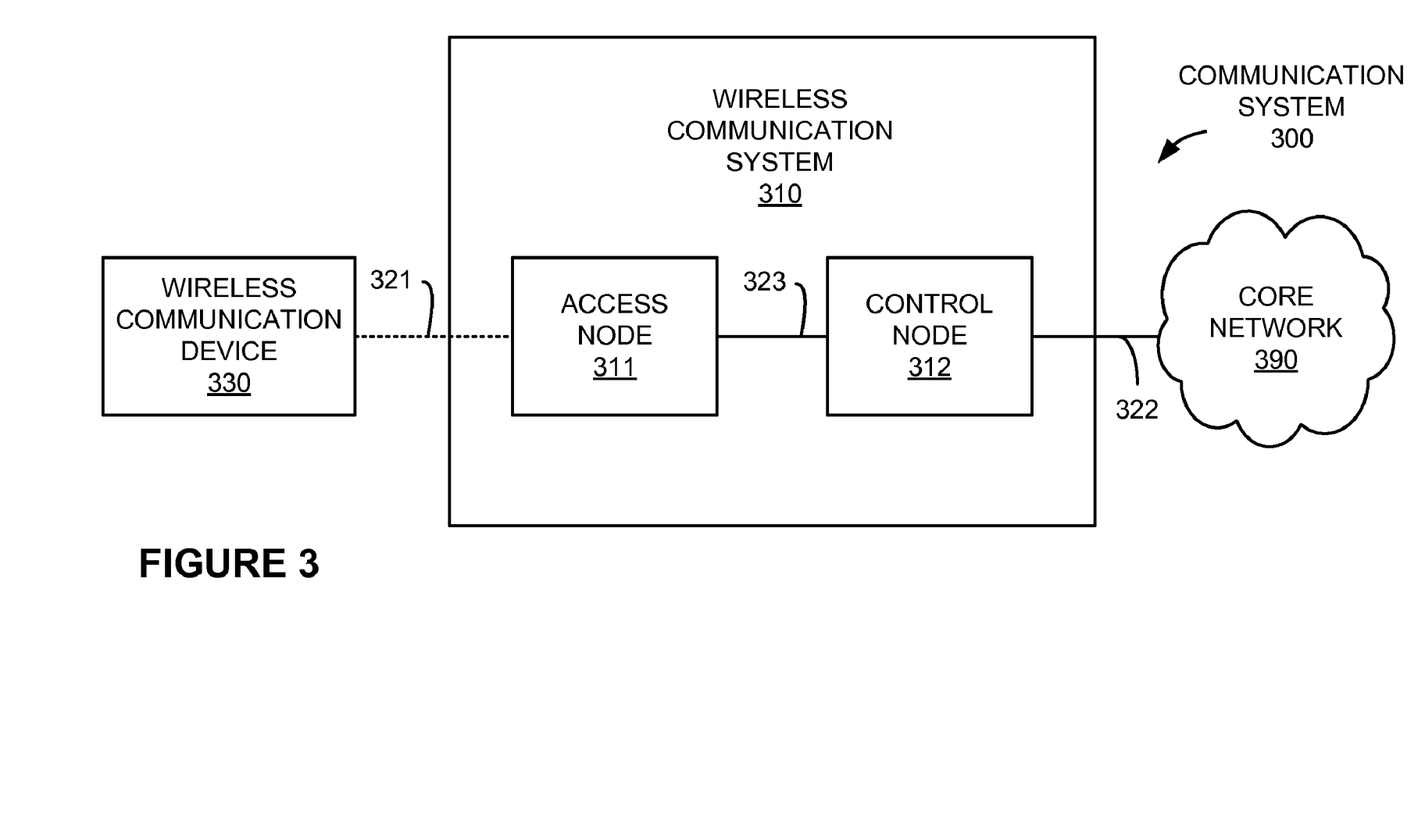
FIG. 3 is a system diagram illustrating a communication system.

FIG. 3 is a system diagram illustrating communication system 300. Communication system 300 includes wireless communication device 330, wireless communication system 310, and core network 390. Wireless communication device 330 and wireless communication system 310 communicate over wireless link 321. Wireless communication system 310 and core network 390 communicate over link 322.

Wireless communication system 310 includes access node 311 and control node 312. Access node 311 and control node 312 communicate over link 323. In some examples, the functionality of wireless communication system 310, as found in access node 311 and control node 312, is included in the same equipment or systems, while in other examples, the functionality is included in separate equipment or systems.

Access node 311 includes communications equipment capable of communicating with wireless communication device 330. Examples of access node 311 can include base stations, base transceiver stations, boomer stations, antennas, radio node controllers (RNC), mobile switching controllers, call processing equipment, wireless access points, telephone switches, Internet routers, network gateways, as well as other type of communication equipment, including combinations thereof.

Control node 312 includes equipment for encoding and decoding communications with wireless communication device 330, as well as processing equipment to determine spreading codes as described herein. Control node 312 could incorporate a computer microprocessor, circuitry, or some other processing device or software system, and may be distributed among multiple processing devices. In some examples, control node 312 is located within the same equipment as access node 311. Control node 312 may also include software such as an operating system, logs, utilities, drivers, networking software, and other software which is typically stored on a computer-readable medium.

Wireless communication device 330 comprises a telephone, transceiver, computer, digital assistant, smart phone, Internet appliance, or some other wireless communication apparatus—including combinations thereof.

Core network 390 could include an Internet network, wireless network, telephony network, optical network, enterprise network, local area network, or some other type of communication network or communication equipment—including combinations thereof.

Wireless link 321 uses various communication media, such as air, space, or some other wireless transport media—including combinations thereof. Wireless link 321 uses various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

Wireless link 321 may comprise many different signals sharing the same link. Wireless link 321 could include multiple signals operating in a single "airpath"—as represented by the dashed line in FIG. 3—comprising multiple communication sessions, frequencies, timeslots, transportation ports, logical transportation links, network sockets, IP sockets, packets, or communication directions. For example, communications for different applications types between wireless communication device 330 and wireless communication system 310 could share the same wireless link 321, but be transferred over different communication sessions, frequencies, timeslots, packets, ports, sockets, logical transport links, or in different directions—including combinations thereof.

Link 322 uses various communication media, such as air, space, metal, optical fiber, or some other signal propagation path—including combinations thereof. Link 322 could be wired or wireless and use various communication protocols such as Internet, Internet protocol (IP), local-area network (LAN), optical networking, hybrid fiber coax (HFC), telephony, T1, or some other communication format—including combinations or variations thereof. Link 322 could be a direct link or might include various equipment, intermediate components, systems, and networks. Link 322 could include multiple signals operating in a single pathway in a similar manner as wireless links 321.

Link 323 comprises an RF, physical, logical, or virtual communication link, capable of communicating data, control signals, and communications, along with other information. In some examples, link 323 is encapsulated within the elements of access node 311 or control node 312 and may be a software or logical link. In other examples, link 323 uses various communication media, such as air, space, metal, optical fiber, or some other signal propagation path—including combinations thereof. Link 323 could be wired or wireless and use various protocols or communication formats as described herein for wireless link 321—including combinations or variations thereof. Link 323 could be a direct link or it might include various equipment, intermediate components, systems, and networks.

Figure 4:
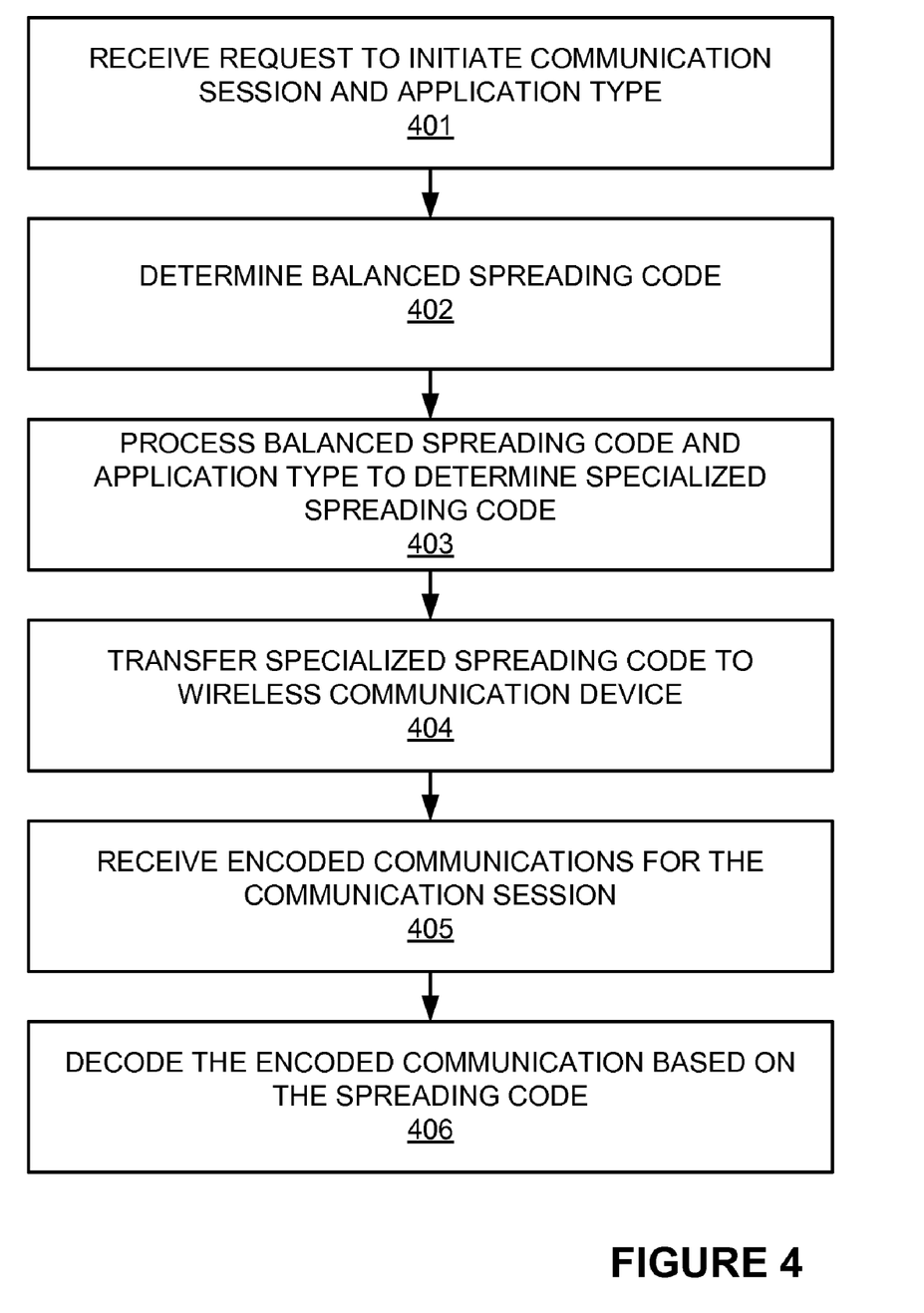
FIG. 4 is a flow diagram illustrating a method of operation of a video system.

FIG. 4 is a flow diagram that illustrates a method of operation of communication system 300, as found in FIG. 3. The phases shown in FIG. 4 are indicated herein parenthetically. In FIG. 4, access node 311 receives (401) a request to initiate a communication session with wireless communication device 330, where the request indicates an application type.

Control node 312 determines (402) a balanced spreading code. A balanced spreading code is determined by considering multiple quality factors, such as cross-correlation, auto-correlation, diversity, and crest factor. These multiple quality factors, among possibly others, are balanced to achieve a spreading code suitable for general communications between wireless communication device 330 and wireless communication system 310. The balanced spreading code could also consider traffic patterns, sector usage, or user-specific considerations, among others factors.

Control node 312 processes (403) the balanced spreading code and the application type to determine a specialized spreading code.

As discussed above, a spreading code could be determined based on the application type. In addition to the application type, a balanced spreading code could be used as a baseline or foundational spreading code, from which further processing could be performed to arrive at a specialized spreading code based on application type. Advantageously, in such an example, the specialized spreading code would then consider the application type in addition to the factors considered when determining the balanced spreading code. A further discussion on application-specific spreading codes is discussed below and illustrated in FIG. 6.

Once the specialized spreading code has been determined, access node 311 transfers the specialized spreading code (404) to wireless communication device 330. The specialized spreading code is used, in typical examples, to encode communications of a communication session over wireless link 321 from wireless communication device 330.

Access node 311 then receives (405) encoded communications for the communication session, where the encoded communications were previously encoded with the specialized spreading code. Control node 312 then decodes (406) the encoded communications based on the specialized spreading code. Since the encoded communications are encoded with the specialized spreading code, the communications are able to be decoded correctly and determined to be transferred from wireless communication device 330.

In further examples, wireless communication device 330, receives the specialized spreading code and encodes the communications based on the specialized spreading code. Wireless communication device 330 transfers the encoded communications over wireless link 321. In other examples, wireless communication device 330 receives the balanced spreading code and determines a specialized spreading code based upon the application type, among other factors. Wireless communication device 330 could then transfer the specialized spreading code to wireless communication system 310.

The communications received in wireless communication system 310 could also be further transferred to core network 390 over link 322, other systems in wireless communication system 310, or other equipment, including combinations thereof.

Figure 5:
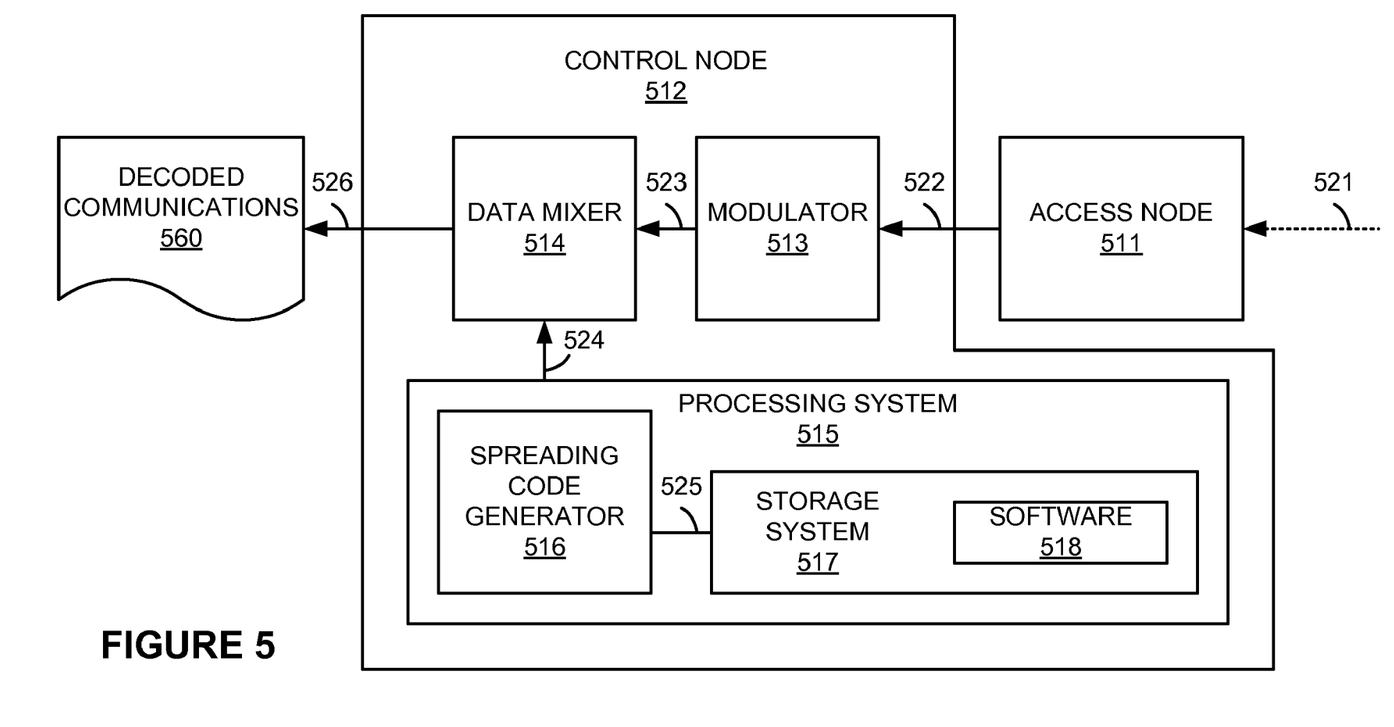
FIG. 5 is a block diagram illustrating an example of a control node.

FIG. 5 illustrates a block diagram of control node 512, as an example of control node 312 found in FIG. 3. Also shown in FIG. 5 is access node 511 and decoded communications 560. Control node 512 includes modulator 513, data mixer 514, and processing system 515. Access node 511 and modulator 513 communicate over link 522. Modulator 513 and data mixer 514 communicate over link 523. Processing system 515 is communicatively linked to data mixer 514 by link 524. Data mixer outputs decoded communications via output link 526. Control node 512 may be distributed among multiple devices that together form elements 513-518 and links 522-526.

Modulator 513 includes equipment or circuitry for modulating the communications into a format suitable for transfer over wireless link 521 through access node 511, in many examples modulating a baseband signal into a suitable RF format for transmission. Modulator 513 also includes equipment or circuitry for receiving and demodulating communications from wireless communication devices through access node 511. Examples of modulator 513 include RF circuitry such as filters, converters, amplifiers, and other circuitry.

Data mixer 514 includes equipment, processors, or software for mixing communications with the spreading code to encode communications. Likewise, data mixer 514 also includes equipment, processors, or software for un-mixing communications with the spreading code to decode communications. In some examples, data mixer 514 includes a multiplier function to encode/decode communications, while in other examples, data mixer 514 includes an summing or adder function to encode/decode communications. Further examples of data mixer 514 include RF circuitry such as filters, converters, multipliers, adders, amplifiers, and other circuitry. In some examples, the functionality of data mixer 514 is incorporated into processing system 515.

Processing system 515 includes spreading code generator 516 and storage system 517. Storage system 517 stores software 518. Spreading code generator 516 is communicatively linked to storage system 517 by link 525.

Processing system 515 retrieves and executes software 518 from storage system 517. Processing system 515 could incorporate a computer microprocessor, logic circuit, or some other processing device, and may be distributed among multiple processing devices. In some examples, processing system 515 is located within the same equipment in which modulator 513 or data mixer 514 are located. Storage system 517 could include a computer-readable medium such as a disk, tape, buffer, cache, integrated circuit, server, or some other memory device, and also may be distributed among multiple memory devices. Software 518 may include an operating system, logs, utilities, drivers, networking software, and other software typically loaded onto a computer system. Software 518 could contain an application program, firmware, or some other form of computer-readable processing instructions. When executed by processing system 515, software 518 directs processing system 515 to operate as described herein.

Spreading code generator 516 includes equipment, circuitry, or software to generate spreading codes as discussed herein. In some examples, spreading code generator 516 includes a computer microprocessor, logic circuit, or some other processing device, and may be distributed among multiple processing devices. In other examples, spreading code generator 516 comprises a software application executable by processing system 515, and stored on storage system 517 on a computer-readable medium. Further examples of spreading code generator 516 are discussed below in FIG. 6.

Access node 511 includes antennas, transceivers, circuitry, as well as other types of communication components—including combinations thereof. Access node 511 communicates with wireless communication devices over wireless link 521.

Decoded communications 560 includes the decoded communications at the output of data mixer 514, and likewise control node 512. Communications encoded with the spreading code are received by way of access node 511 into control node 512 and demodulated by modulator 513 and decoded by data mixer 514. The decoded, demodulated communications are suitable for transfer to further systems and equipment, for example, core network 390 as found in FIG. 3

Links 522-526 comprise RF, physical, logical, or virtual communication links, capable of communicating data, control signals, and communications, along with other information. In some examples, links 522-526 are encapsulated within the elements of access node 511, modulator 513, data mixer 514, or processing system 515 and may be software or logical links. Links 522-526 could be wired or wireless and use various protocols or communication formats as described herein for wireless link 121—including combinations or variations thereof. Links 522-526 could be direct links or include various equipment, intermediate components, systems, and networks. Wireless link 521 incorporates features similar to those discussed with reference to wireless link 121 or wireless link 321.

Figure 6:
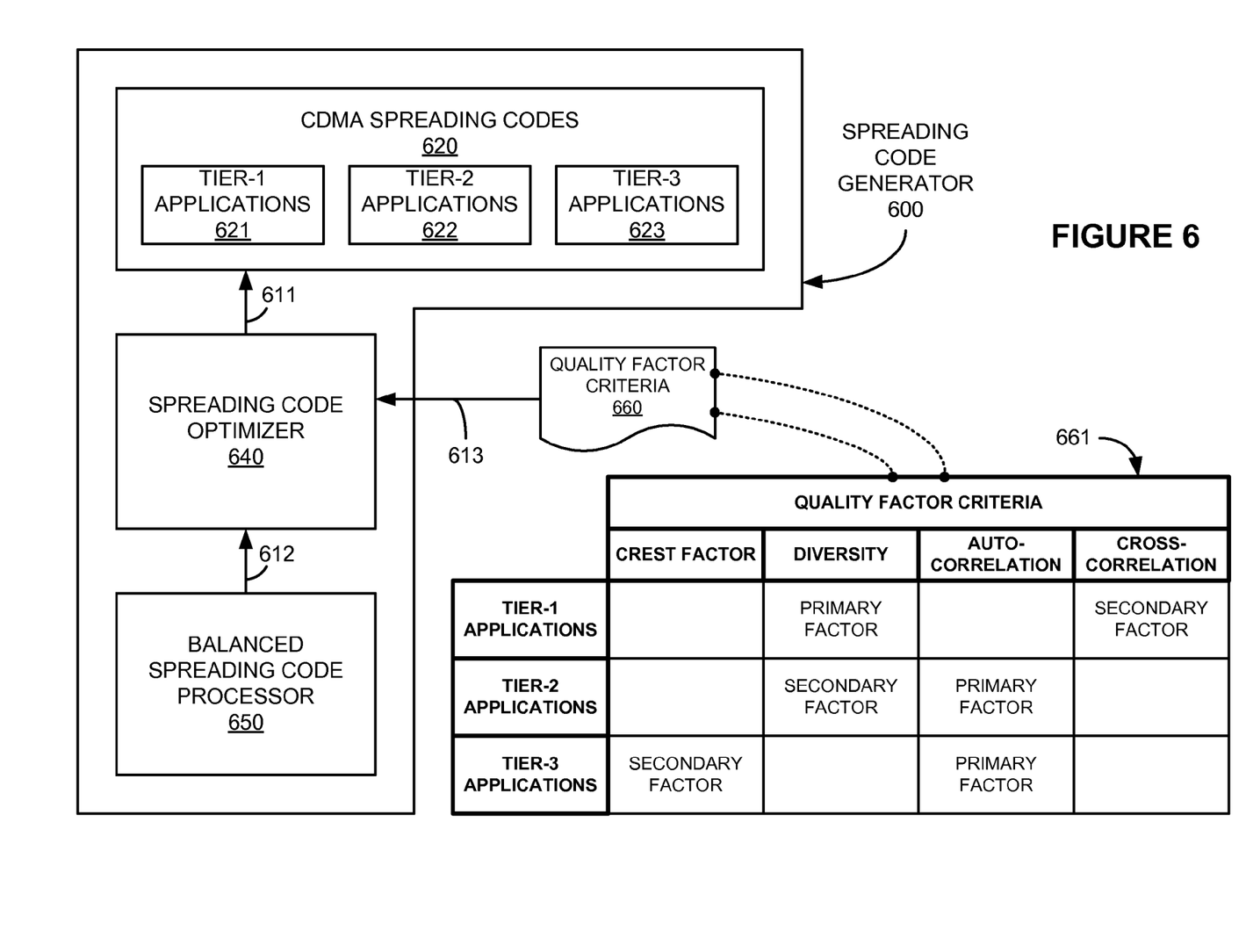
FIG. 6 is a block diagram illustrating an example of a spreading code generator.

FIG. 6 is a block diagram illustrating spreading code generator 600, as an example of spreading code generator 516 in FIG. 5. FIG. 6 includes spreading code generator 600 and quality factor criteria 660. Spreading code generator 600 receives quality factor criteria via link 613.

Spreading code generator 600 includes CDMA spreading codes 620, spreading code optimizer 640, and balanced spreading code processor 650. CDMA spreading codes 620 and spreading code optimizer 640 communicate over link 611. Spreading code optimizer 640 and balanced spreading code processor 650 communicate over link 650.

In this example, links 611-613 are logical software links, although in other examples links 611-613 could be similar as described for links 522-526 in FIG. 5. Also, in this example, spreading code optimizer 640 and balanced spreading code processor 650 are software elements, executable on a processor, and stored on a computer-readable medium as described above for processing system 515 in FIG. 5. In other examples, spreading code optimizer 640 and balanced spreading code processor 650 could be implemented by circuitry or communications equipment.

Balanced spreading code processor 650 determines a balanced spreading code. A balanced spreading code could be determined, for example, by considering many quality factors for a spreading code. These factors could include auto-correlation, cross-correlation, crest factor, and diversity, among others. These factors are balanced to achieve a spreading code suitable for optimum general communications. The balanced spreading code could also consider traffic patterns, sector usage, or user-specific considerations, among others considerations. The balanced spreading code could then be used as a baseline or foundational spreading code.

Spreading code optimizer 640 determines a specialized spreading code. Spreading code optimizer 640 receives a balanced spreading code from balanced spreading code processor 650 over link 612. In addition to the balanced spreading code, spreading code optimizer 640 receives quality factor criteria 660 over link 613. Spreading code optimizer 640 processes the balanced spreading code received from balanced spreading code processor 650 and quality factor criteria received from quality factor criteria 660 and determines a specialized spreading code. In many examples, the specialized spreading code would consider the application type in addition to the factors considered when determining the balanced spreading code.

In addition to the quality factors and application type considered by the balanced spreading code and the specialized spreading code, spreading code optimizer 640 could also consider other factors, such as the activity level of a wireless communication device, the number of communication sessions active on a wireless communication device, activity level of a sector in which a wireless communication device is located, the user of a wireless communication device, or a service-level agreement, a quality-of-service policy for a user, among other factors in determining a specialized spreading code.

A sector can represent a particular region of wireless coverage, typically served by a single antenna, antenna array, or base transceiver station. In many examples, there are multiple sectors associated with a single antenna tower or base station, with each sector describing a slice of the surrounding geographic region serviced by an antenna tower or base station.

In many examples, the quality of the communications can be influenced by the quality of the spreading code. Several spreading code quality factors or metrics can impact a spreading code and the spreading code effectiveness over a wireless link. These quality factors include auto-correlation, cross-correlation, crest factor, and diversity, among other factors. The factors could also be periodic or aperiodic. Correlation is typically defined as a relationship between spreading codes, and how closely communications encoded with the spreading code relate to one another—cross-correlation relates to how different communication sessions correlate to one another over a time frame, and auto-correlation relates to how a communication session correlates to itself over a time frame. Crest factor relates to the ratio of the peak power of a communication session to an average power of the communication session. Diversity relates to the amount of energy spreading over a particular bandwidth that a spreading code achieves.

Quality factor criteria 660, in this example, includes the quality factor criteria found in table 661. Table 661 includes four quality factor criteria—crest factor, diversity, auto-correlation, and cross-correlation—listed as column headings. Along each row of table 661 has application types are grouped into tiers. For example, tier-1 applications could include real-time application types such as voice traffic, tier-2 applications could include near-real-time application types such as web pages and push-to-talk, and tier-3 applications could include non-real-time application types such as instant messaging, text messaging, and email. It should be understood that other groupings and tier configurations are possible. Associated with each tier level of application are two quality factors that are considered. In table 661, tier-1 applications have a primary factor of diversity and a secondary factor of cross-correlation, tier-2 applications have a primary factor of auto-correlation and a secondary factor of diversity, and tier-3 applications have a primary factor of auto-correlation and a secondary factor of crest factor. These primary and secondary factors are then used by spreading code optimizer 640 to determine a specialized spreading code.

Once spreading code optimizer 640 has determined a specialized spreading code, the specialized spreading code is transferred to CDMA spreading codes 620 over link 611. CDMA spreading codes 620 includes tier-1 applications 612, tier-2 applications 622, and tier-3 applications 623. For each tier, a specialized spreading code could be determined and stored for usage when a wireless communication device initiates a communication session for the various application types found within each tier. In FIG. 6, CDMA spreading codes 620 could indicate a computer-readable storage area, with separate storage areas for the spreading codes of each tier. In other examples, CDMA spreading codes 620 indicates the spreading code to be transferred to a wireless communication device, and is not stored on a tier-by-tier basis. Once the spreading codes have been transferred to CDMA spreading codes 620, the spreading codes could be retrieved at a later time to decode communications received from wireless communication devices.

A spreading code determined by the methods and processes herein has quality factors tailored to best suit the properties of the application types. For example, some application types require high bandwidth without requiring high reliability, such as video streaming. Other applications may require low bandwidth, but high reliability, such as voice communications. Advantageously, a spreading code determined based upon application type or other factors, as detailed herein, instead of on a random or pseudo-random basis can enhance the performance and efficiency of communications over wireless links, as well as tailor the spreading code to the bandwidth and reliability requirements of each application type.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, the method comprising:

receiving a request to initiate a communication session with a wireless communication device, wherein the request indicates an application type;

determining a balanced spreading code based on a set of quality factors, and processing the balanced spreading code and the application type to determine a specialized spreading code;

transferring the specialized spreading code to the wireless communication device;

receiving communications for the communication session encoded with at least the specialized spreading code; and decoding the encoded communications.

2. The method of operating the communication system of claim 1, further comprising:

in the wireless communication device, receiving the specialized spreading code, encoding the communications based on the specialized spreading code, and transferring the communications.

3. The method of operating the communication system of claim 1, wherein determining the specialized spreading code based on the application type comprises:
   determining the specialized spreading code based on the application type and a locality of the wireless communication device.

4. The method of operating the communication system of claim 1, wherein determining the specialized spreading code based on the application type comprises:
   determining the specialized spreading code based on the application type and an activity level of the wireless communication device.

5. The method of operating the communication system of claim 1, wherein determining the specialized spreading code based on the application type comprises:
   determining the specialized spreading code based on the application type and an activity level of a sector of the communication system, wherein the wireless communication device is located in the sector.

6. The method of operating the communication system of claim 1, wherein determining the specialized spreading code based on the application type comprises:
   determining the specialized spreading code based on the application type and a number of communication sessions active on the wireless communication device.

7. The method of operating the communication system of claim 1, wherein the set of the quality factors includes at least the quality factors of auto-correlation, cross-correlation, crest factor, and diversity.

8. The method of operating the communication system of claim 1, wherein determining the specialized spreading code based on the application type comprises optimizing the balanced spreading code for a diversity quality factor and a cross-correlation quality factor when the application type indicates voice communications.

9. The method of operating the communication system of claim 1, wherein determining the specialized spreading code based on the application type comprises optimizing the balanced spreading code for an auto-correlation quality factor and a diversity quality factor when the application type indicates web page communications.

10. The method of operating the communication system of claim 1, wherein determining the specialized spreading code based on the application type comprises optimizing the balanced spreading code for an auto-correlation quality factor and a crest factor quality factor when the application type indicates email communications.

11. A communication system comprising:
    an access node configured to receive a request to initiate a communication session with a wireless communication device, wherein the request indicates an application type;
    a control node configured to determine a balanced spreading code based on a set of quality factors, and process the balanced spreading code and the application type to determine a specialized spreading code;
    the access node configured to transfer the specialized spreading code to the wireless communication device;
    the access node configured to receive communications for the communication session encoded with at least the specialized spreading code; and
    the control node configured to decode the encoded communications.

12. The communication system of claim 11, further comprising:
    the wireless communication device configured to receive the specialized spreading code, encode the communications based on the specialized spreading code, and transfer the communications.

13. The communication system of claim 11, comprising:
    the control node configured to determine the specialized spreading code based on the application type and a locality of the wireless communication device.

14. The communication system of claim 11, comprising:
    the control node configured to determine the specialized spreading code based on the application type and an activity level of the wireless communication device.

15. The communication system of claim 11, comprising:
    the control node configured to determine the specialized spreading code based on the application type and an activity level of a sector of the communication system, wherein the wireless communication device is located in the sector.

16. The communication system of claim 11, comprising:
    the control node configured to determine the specialized spreading code based on the application type and a number of communication sessions active on the wireless communication device.

17. The communication system of claim 11, wherein the set of the quality factors includes at least the quality factors of auto-correlation, cross-correlation, crest factor, and diversity.

18. The communication system of claim 11, comprising:
    the control node configured to optimize the balanced spreading code for a diversity quality factor and a cross-correlation quality factor when the application type indicates voice communications.

19. The communication system of claim 11, comprising:
    the control node configured to optimize the balanced spreading code for an auto-correlation quality factor and a diversity quality factor when the application type indicates web page communications.

20. The communication system of claim 11, comprising:
    the control node configured to optimize the balanced spreading code for an auto-correlation quality factor and a crest factor quality factor when the application type indicates email communications.

* * * * *